US011317778B2

(12) United States Patent
Kim

(10) Patent No.: US 11,317,778 B2
(45) Date of Patent: May 3, 2022

(54) MOBILE ROBOT

(71) Applicant: LG ELECTRONICS INC., Seoul (KR)

(72) Inventor: Minsoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 349 days.

(21) Appl. No.: 16/480,775

(22) PCT Filed: Jan. 25, 2018

(86) PCT No.: PCT/KR2018/001101
§ 371 (c)(1),
(2) Date: Jul. 25, 2019

(87) PCT Pub. No.: WO2018/139865
PCT Pub. Date: Aug. 2, 2018

(65) Prior Publication Data
US 2019/0387945 A1 Dec. 26, 2019

(30) Foreign Application Priority Data
Jan. 25, 2017 (KR) .................. 10-2017-0012266

(51) Int. Cl.
*G05B 19/04* (2006.01)
*G05B 19/18* (2006.01)
(Continued)

(52) U.S. Cl.
CPC ......... *A47L 11/4061* (2013.01); *A47L 9/2852* (2013.01); *A47L 11/4011* (2013.01);
(Continued)

(58) Field of Classification Search
CPC ... B25J 11/00; B25J 13/00; B25J 19/02; B25J 5/00; B25J 9/00; B25J 9/16;
(Continued)

(56) References Cited

U.S. PATENT DOCUMENTS 9,408,041 B1 * 8/2016 Abehassera ........... H04W 4/023
9,621,368 B2 * 4/2017 Jin ........................... G09G 5/02
(Continued)

FOREIGN PATENT DOCUMENTS

JP  2015-197250       11/2015
JP  2016-167200   *   9/2016
(Continued)

OTHER PUBLICATIONS

International Search Report dated May 28, 2018 issued in Application No. PCT/KR2018/001101.

*Primary Examiner* — Harry Y Oh
(74) *Attorney, Agent, or Firm* — KED & Associates LLP

(57) ABSTRACT

Disclosed is a mobile robot for determining a type and position of a home appliance present within in a traveling area and controlling the home appliance according to a control command or a situation. The mobile robot includes a controller for determining the type and position of the home appliance positioned within the traveling area based on the image acquired through an image acquisition unit, and for generating and outputting a home appliance map that is a traveling area map on which at least one of the type or position of the home appliance is indicated, wherein the home appliance is remotely controlled according to a control command of a user, a situation is determined according to the acquired information without a control command, and a home appliance appropriate for a specific situation is controlled.

11 Claims, 11 Drawing Sheets

(51) Int. Cl.

| | |
|---|---|
| *A47L 11/40* | (2006.01) |
| *G06T 7/70* | (2017.01) |
| *A47L 9/28* | (2006.01) |
| *G05B 13/02* | (2006.01) |
| *G05D 1/00* | (2006.01) |
| *G05D 1/02* | (2020.01) |
| *G06K 9/00* | (2022.01) |
| *H04L 12/28* | (2006.01) |

(52) U.S. Cl.
CPC ......... *G05B 13/027* (2013.01); *G05D 1/0022* (2013.01); *G05D 1/0246* (2013.01); *G05D 1/0274* (2013.01); *G06K 9/00664* (2013.01); *G06T 7/70* (2017.01); *H04L 12/2816* (2013.01); *A47L 2201/04* (2013.01); *G05B 2219/50391* (2013.01); *G05D 2201/0203* (2013.01); *G06T 2207/20081* (2013.01)

(58) Field of Classification Search
CPC ............. H04L 12/2816; H04L 12/2809; G06T 2207/20081; G06T 7/70; G05D 1/0022; G05D 1/0246; G05D 1/0274; G05D 2201/0203; G05B 13/027; G05B 2219/50391; G06K 9/00664; A47L 11/4011; A47L 11/4061; A47L 2201/04; A47L 9/2852; A47L 2201/02; A47L 9/28; A47L 9/2805; A47L 9/2894
See application file for complete search history.

(56) References Cited

U.S. PATENT DOCUMENTS

| | | | | |
|---|---|---|---|---|
| 10,091,015 | B2* | 10/2018 | Kennedy | H04W 4/70 |
| 2005/0071047 | A1* | 3/2005 | Okabayashi | G05D 1/0242 |
| | | | | 700/245 |
| 2010/0182136 | A1* | 7/2010 | Pryor | G01F 23/292 |
| | | | | 340/425.5 |
| 2010/0218094 | A1* | 8/2010 | Ofek | G06F 3/167 |
| | | | | 715/706 |
| 2013/0214935 | A1* | 8/2013 | Kim | H04L 12/2816 |
| | | | | 340/870.02 |
| 2013/0332567 | A1* | 12/2013 | Park | H04L 67/306 |
| | | | | 709/217 |
| 2014/0129004 | A1* | 5/2014 | Takayama | G06Q 10/06 |
| | | | | 700/83 |
| 2014/0218517 | A1* | 8/2014 | Kim | H04L 12/2818 |
| | | | | 348/143 |
| 2014/0316594 | A1* | 10/2014 | Steele | G05B 9/02 |
| | | | | 700/291 |
| 2015/0058740 | A1* | 2/2015 | Asahi | G06F 3/0482 |
| | | | | 715/740 |
| 2017/0003736 | A1* | 1/2017 | Turon | H04L 12/2816 |
| 2017/0093594 | A1* | 3/2017 | Peak | H04L 12/2823 |
| 2017/0176967 | A1* | 6/2017 | Takada | G06Q 10/00 |

FOREIGN PATENT DOCUMENTS

| | | |
|---|---|---|
| KR | 10-2001-0106845 | 12/2001 |
| KR | 10-2002-0088880 | 11/2002 |
| KR | 10-2006-0027728 | 3/2006 |

* cited by examiner

MOBILE ROBOT

CROSS-REFERENCE TO RELATED PATENT APPLICATIONS

This application is a U.S. National Stage Application under 35 U.S.C. P71 of PCT Application No. PCT/KR2018/001101, filed Jan. 25, 2018, which claims priority to Korean Patent Application No. 10-2017-0012266, filed Jan. 25, 2017, whose entire disclosures are hereby incorporated by reference.

TECHNICAL FIELD

The present invention relates to a mobile robot, and more particularly, to a mobile robot that communicates with an illumination apparatus and determines a position of the illumination apparatus.

BACKGROUND ART

A mobile robot is an apparatus for automatic cleaning by absorbing a foreign substance such as dust from a floor surface while autonomously traveling an area as a cleaning target.

The mobile robot includes a chargeable battery, is capable of freely moving and autonomously moving using operation power of the battery, absorbs a foreign substance of a floor surface while moving to perform cleaning, and is configured to return to a charging stand and to charge the battery if necessary.

In general, such a mobile robot that detects a distance to an obstacle such as furniture, office supplies, a wall, or the like, which is installed within a traveling area, and controls left and right wheels to perform an obstacle avoidance operation.

The mobile robot may acquire a surrounding image, detects an object in the vicinity of the mobile robot, and generates a map of the traveling area. Information of the map of the traveling area may be pre-stored information or information provided from the outside. The mobile robot may be moved to a specific position within the traveling area or may determine the current position, based on the map of the traveling area.

The mobile robot may determine the current position using a method of extracting a feature point from an image captured by photographing a surrounding environment. The mobile robot may also detect various objects from the captured image.

Devices that are capable of communicating in an Internet of things (IoT) environment may perform communication and may be connected to each other via wired or wireless communication. Various home appliances positioned in a traveling area in which a mobile robot travels may be connected to the mobile robot via communication. In this case, the mobile robot may acquire various pieces of information from a home appliance or may remotely control the home appliance. For example, the home appliance may include various electronic apparatus such as an air conditioner, a refrigerator, a clothes treating apparatus, an illumination apparatus, a security apparatus, a computer, an electric fan, a television (TV), or a humidifier.

However, in order to use a home appliance positioned within a traveling area, the mobile robot needs to determine a position and type of each home appliance. In particular, the mobile robot needs to detect various home appliances while autonomously moving within the traveling area and to acquire various pieces of information such as a position and type of the detected home appliance.

In addition, it is necessary to indicate the home appliance, the type and position of which are determined by the mobile robot for detecting a home appliance, on a map and to remotely control the home appliance in various situations using the map.

DISCLOSURE

Technical Problem

To overcome the above problems, embodiments of the present invention provide a mobile robot for determining a position and type of a home appliance while moving within a traveling area.

Embodiments of the present invention provide a mobile robot for outputting a traveling area map in which information related to a home appliance is indicated, and for remotely controlling the home appliance based on user input or various pieces of information.

It is to be understood that both the foregoing general description and the following detailed description of the present invention are exemplary and explanatory and are intended to provide further explanation of the invention as claimed.

Technical Solution

To overcome the problems, a mobile robot according to an embodiment of the present invention includes a controller configured to control a traveling unit to move a main body within a traveling area, and to determine a type and position of a home appliance positioned within the traveling area based on an image acquired through an image acquisition unit.

To overcome the problems, a mobile robot according to an embodiment of the present invention includes a controller configured to output a home appliance map in which a type and position of a home appliance, and whether the home appliance is controllable is indicated, and to remotely control a specific home appliance based on a control command of a user or the acquired information.

Details of other embodiments are included in detailed descriptions and drawings.

Advantageous Effects

As is apparent from the foregoing description, the embodiments of the present invention have the following one or more effects.

First, a type and position of a home appliance may be autonomously determined while a mobile robot moves within a traveling area without separate input, thereby enhancing user convenience.

Second, a traveling area map on which information related to a home appliance is indicated may be output, and thus a user may intuitively recognize the arrangement and state of home appliances.

Third, a home appliance may be remotely controlled according to a control command of a user, a situation may be determined according to information acquired without a control command, and a home appliance appropriate for a specific situation may be controlled.

It will be appreciated by persons skilled in the art that that the effects that could be achieved with the present invention are not limited to what has been particularly described hereinabove and other advantages of the present invention will be more clearly understood from the following claims.

DETAILED DESCRIPTION OF THE PREFERRED EMBODIMENTS

Figure 1:
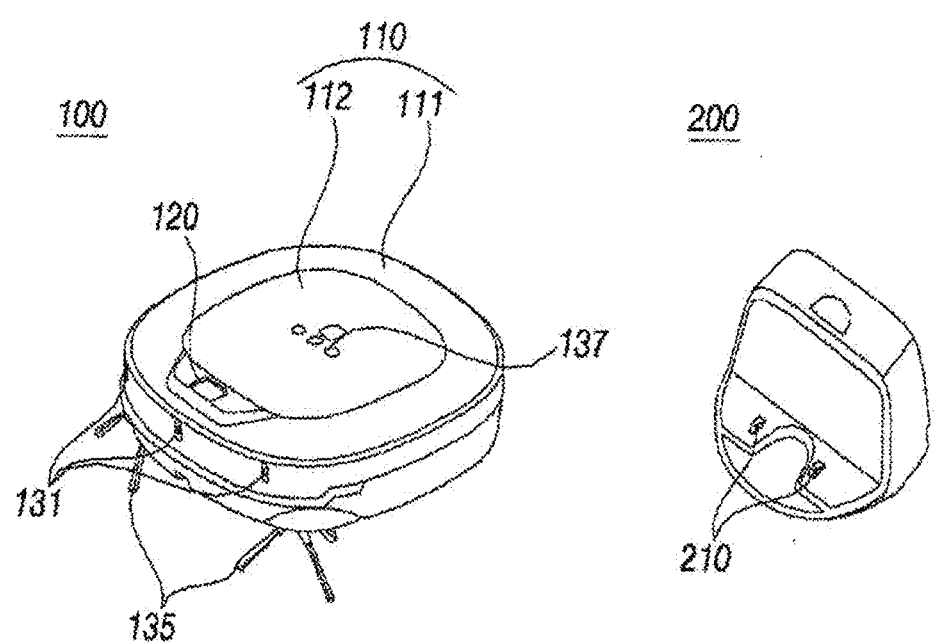
FIG. 1 is a perspective view showing a mobile robot and a charging stand for charging a mobile robot according to an embodiment of the present invention.

The attached drawings for illustrating exemplary embodiments of the present invention are referred to in order to gain a sufficient understanding of the present invention, the merits thereof, and the objectives accomplished by the implementation of the present invention. The invention may, however, be embodied in many different forms and should not be construed as being limited to the embodiments set forth herein, rather, these embodiments are provided so that this disclosure will be thorough and complete, and will fully convey the concept of the invention to one of ordinary skill in the art. Meanwhile, the terminology used herein is for the purpose of describing particular embodiments and is not intended to limit the invention. Like reference numerals in the drawings denote like elements. In addition, it is noted that a controller and other components according to the present invention may be implemented by one or more processors or may be implemented by a hardware device.

A mobile robot according to the present invention may determine positions and types of various home appliances positioned in a traveling area while moving within the traveling area. The home appliance may be an electronic device positioned within the traveling area. For example, the home appliance may include various electronic devices such as an air conditioner, a refrigerator, a clothes treating apparatus, an illumination apparatus, a security apparatus, a computer, an electric fan, a television (TV), or a humidifier.

The mobile robot according to the present invention may determine a position and type of a home appliance based on an image acquired through an image acquisition unit. The type of the home appliance may conceptually include a model name, a manufacturing date, a type, a function, a manufacturer, or the like of the home appliance. The mobile robot may perform deep learning based on the acquired image to determine the type of the home appliance.

The mobile robot according to the present invention may determine an operation state of the home appliance based on at least one of information acquired through a communication unit or an image acquired through the image acquisition unit. When the home appliance includes a unit that is capable of communicating, the mobile robot may communicate with the home appliance to receive various pieces of information transmitted by the home appliance.

The mobile robot according to the present invention may output a home appliance map that is a map of a traveling area, on which at least one of the type, the position, or the operation state of the home appliance is indicated, through a preset mobile terminal or an output unit.

The mobile robot according to the present invention may determine whether it is possible to remotely control the home appliance and may indicate the result. Upon receiving a control command of the remotely controllable home appliance, the mobile robot may remotely control the home appliance based on the control command.

The mobile robot according to the present invention may remotely control a specific home appliance based on information acquired through various units. For example, the mobile robot may determine the current situation based on the acquired information and may control the home appliance to perform an operation corresponding to the determined situation.

Hereinafter, a mobile robot according to the present invention will be described in detail. With reference to FIGS. 1 to 5, the appearance and configuration of the mobile robot according to the present invention will be described. With reference to FIGS. 6 to 11, the case in which the mobile robot according to the present invention acquires information on a home appliance and controls the home appliance will be described.

Figure 2:
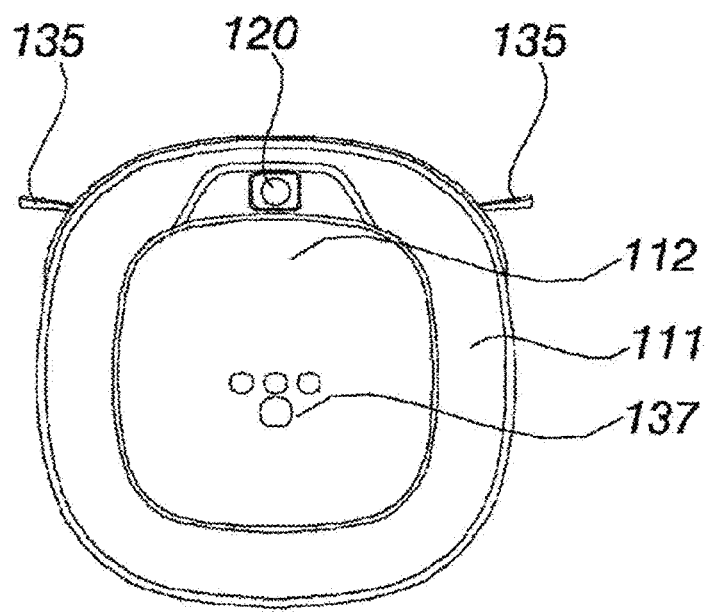
FIG. 2 is a diagram showing an upper surface portion of a mobile robot according to an embodiment of the present invention.
Figure 3:
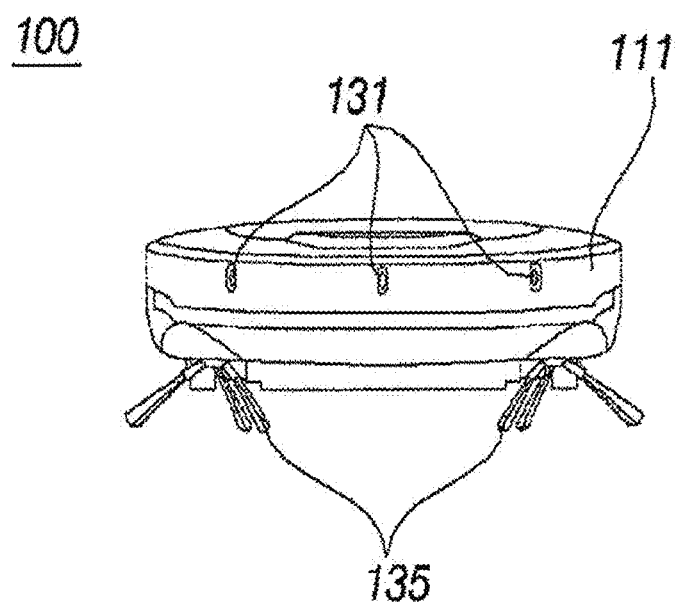
FIG. 3 is a diagram showing a front surface portion of a mobile robot according to an embodiment of the present invention.
Figure 4:
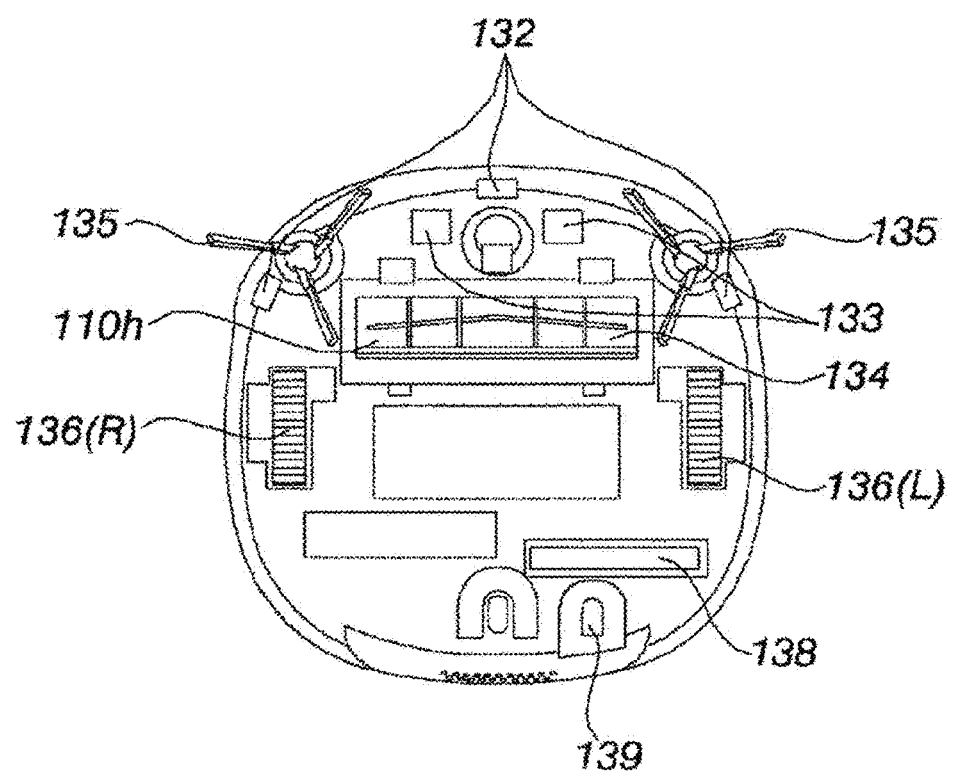
FIG. 4 is a diagram showing a bottom surface portion of a mobile robot according to an embodiment of the present invention.

FIG. 1 is a perspective view showing a mobile robot and a charging stand for charging a mobile robot according to an embodiment of the present invention. FIG. 2 is a diagram showing an upper surface portion of a mobile robot according to an embodiment of the present invention. FIG. 3 is a diagram showing a front surface portion of a mobile robot according to an embodiment of the present invention. FIG. 4 is a diagram showing a bottom surface portion of a mobile robot according to an embodiment of the present invention.

As shown in FIGS. 1 to 4, a mobile robot 100 may include a main body 110 and an image acquisition unit 120 for acquiring a surrounding image of the main body 110. Hereinafter, with regard to definition of each component of the main body 110, a portion towards a ceiling within the traveling area is defined as the upper surface portion (refer to FIG. 2), a portion towards a bottom within the traveling area is defined as the bottom surface portion (refer to FIG. 4), and a portion of a circumference of the main body 110 between the upper surface portion and the bottom surface portion, which is towards a traveling direction, is defined as the front surface portion (refer to FIG. 3).

The mobile robot 100 may include a traveling unit 160 for moving the main body 110. The traveling unit 160 may include at least one driving wheel 136 for moving the main body 110. The traveling unit 160 may include a driving motor (not shown) that is connected to the driving wheel 136 and rotates a driving wheel. The driving wheel 136 may include wheels that are installed at left and right sides of the main body 110, which will be referred to as a left wheel 136(L) and a right wheel 136(R), respectively.

The left wheel 136(L) and the right wheel 136(R) may be driven by one driving motor, and as necessary, may also include a left wheel driving motor for driving the left wheel 136(L) and a right wheel driving motor for driving the right wheel 136(R), respectively. A traveling direction of the main body 110 may be changed to a left or right side by forming a rotation speed difference between the left wheel 136(L) and the right wheel 136(R).

An absorption inlet 110h for absorbing air may be formed in the bottom surface portion of the main body 110, and the main body 110 may include an absorption device (not shown) for providing absorption force to absorb air through the absorption inlet 110h, and a dust container (not shown) for collecting absorbed dust with air through the absorption inlet 110h.

The main body 110 may include a case 111 for forming a space for accommodating various components included in the mobile robot 100. An opening for insertion and separation of the dust container may be formed in the case 111, and a dust container cover 112 that opens and closes the opening may be rotatably installed on the case 111.

The main body 110 may include a main brush 134 with a roll type, which has brushes exposed through the absorption inlet 110h, and an auxiliary brush 135 that is positioned at a front side of the bottom surface portion of the main body 110 and has brushes including a plurality of wings that radially extends. Dusts may be removed from the floor in a traveling area via rotation of the brushes 134 and 135, and dusts separated from the floor may be absorbed through the absorption inlet 110h and may be collected in the dust container.

A battery 138 may supply power required for an overall operation of the mobile robot 100 as well as the driving motor. When the battery 138 is discharged, the mobile robot 100 may travel to return to a charging stand 200 for charging, and during traveling to return, the mobile robot 100 may autonomously detect a position of the charging stand 200.

The charging stand 200 may include a signal transmitter (not shown) for transmitting a predetermined return signal. The return signal may be an ultrasonic signal or an infrared (IR) signal, but is not limited thereto.

The mobile robot 100 may include a signal detector (not shown) for receiving the return signal. The charging stand 200 may transmit an IR signal through a signal transmitter, and the signal detector may include an IR sensor for detecting the IR signal. The mobile robot 100 may be moved to a position of the charging stand 200 and may be docked on the charging stand 200 according to the IR signal transmitted from the charging stand 200. Through such docking, charging may be performed between a charging terminal 133 of the mobile robot 100 and a charging terminal 210 of the charging stand 200

The image acquisition unit 120 may photograph a traveling area and may include a digital camera. The digital camera may include an image sensor (e.g., a CMOS image sensor) including at least one optical lens, and a plurality of photodiodes (e.g., pixels) on which an image is formed by light passing through the optical lens, and a digital signal processor (DSP) for configuring an image based on a signal output from the photodiodes. The DSP may generate a video image including frames including still images as well as a still image.

The image acquisition unit 120 may be installed on the upper surface portion of the main body 110 and may acquire an image of the ceiling within the traveling area, but a position and a photograph range of the image acquisition unit 120 are not limited thereto. For example, the image acquisition unit 120 may be installed to acquire an image of a front side of the main body 110.

The mobile robot 100 may further include an obstacle detection sensor 131 for detecting a forward obstacle. The mobile robot 100 may further include a cliff detection sensor 132 for detecting whether a cliff is present on the floor in the cleaning area, and a lower camera sensor 139 for acquiring an image of the floor.

The mobile robot 100 may include an input unit 137 for inputting On/Off or various commands. The mobile robot 100 may receive various control command required for an overall operation of the mobile robot 100 through the input unit 137. The mobile robot 100 may include an output unit (not shown) and may display reservation information, a battery state, an operation mode, an operation state, an error state, or the like.

Figure 5:
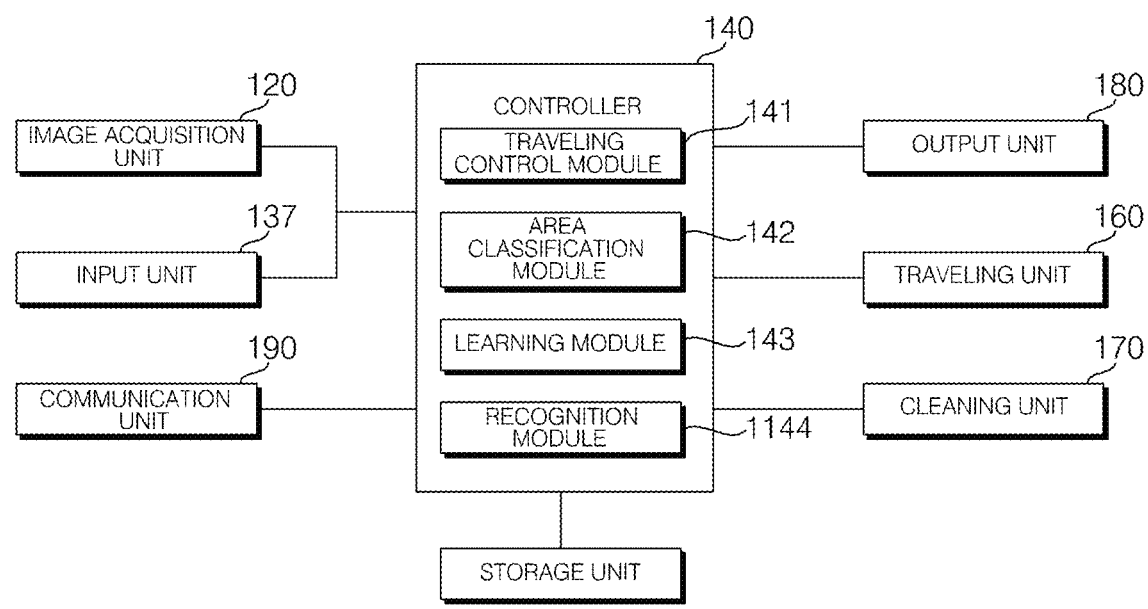
FIG. 5 is a block diagram for explanation of components of a mobile robot according to an embodiment of the present invention.

FIG. 5 is a block diagram for explanation of components of a mobile robot according to an embodiment of the present invention.

Referring to FIG. 5, the mobile robot 100 may include the image acquisition unit 120, the input unit 137, a controller 140, a storage unit 150, the traveling unit 160, a cleaning unit 170, an output unit 180, and a communication unit 190.

The mobile robot 100 may receive various commands transmitted by a remote controller (not shown) or a mobile terminal (not shown) through the communication unit 190. In this case, the remote controller or the mobile terminal may perform the same function as the input unit 137 for receiving a user command with respect to the mobile robot.

For example, the mobile terminal may have an application for controlling the mobile robot 100, may indicate a map of a traveling area to be cleaned by the mobile robot 100 by executing the application, and may specify an area on the map in order to clean the specific area. The mobile terminal may be, for example, a remote controller, a PDA, a laptop, a smart phone, or a tablet PC, in which an application for map setting is installed.

The remote controller or the mobile terminal may output various pieces of information transmitted by the mobile robot. In this case, the remote controller or the mobile terminal may perform the same function as the output unit 180 for outputting various pieces of information.

For example, the mobile terminal may communicate with the mobile robot 100, may indicate the current position of the mobile robot with the map, and may indicate information on a plurality of areas. The mobile terminal may update and indicate the position along with driving of the mobile robot.

The controller 140 may control the image acquisition unit 120, the input unit 137, and the traveling unit 160, which are included in the mobile robot 100, and may control an overall operation of the mobile robot 100.

The storage unit 150 may record various pieces of information required for control of the mobile robot 100 and may include a volatile or non-volatile recording medium. The recording medium may store data readable by a microprocessor and may include a hard disk drive (HDD), a solid state disk (SSD), a silicon disk drive (SDD), ROM, RAM, CD-ROM, a magnetic tape, a floppy disk, an optical data storage device, and the like.

The storage unit 150 may store a map of a traveling area. The map may be input by an external terminal that exchanges information with the mobile robot 100 by wire or wirelessly and may be generated via autonomous learning of the mobile robot 100.

Positions of rooms within the traveling area may be indicated in the map. The current position of the mobile robot 100 may be indicated on the map, and the current position of the mobile robot 100 on the map may be updated during a traveling procedure. The mobile terminal may store the same map as the map stored in the storage unit 150.

The controller 140 may drive the cleaning unit 170 to absorb surrounding dusts or foreign substances of the mobile robot 100 during traveling control of the mobile robot 100. In this case, a brush (not shown) included in the cleaning unit 170 may make the mobile robot 100 be in a state in which surrounding dusts or foreign substances are easily absorbed. The absorption device (not shown) included in the cleaning unit 170 may absorb dusts or foreign substances.

The controller 140 may control the mobile robot 100 to perform cleaning while being moved to a specific area by the traveling unit 160.

The controller 140 may include a traveling control module 141, an area classification module 142, a learning module 143, and a recognition module 144.

The traveling control module 141 may control traveling of the mobile robot 100 and may control driving of the traveling unit 160 according to traveling setting. The traveling control module 141 may recognize a moving path of the mobile robot 100 based on an operation of the traveling unit 160. For example, the traveling control module 141 may recognize the current or past moving speed, a traveling distance, or the like of the mobile robot 100 based on rotation speed of the driving wheel 136, and may also recognize the current or past direction change procedure according to a rotation direction of each of the driving wheels 136(L) and 136(R). Based on the recognized traveling information of the mobile robot 100, the position of the mobile robot 100 on the map may be updated.

The area classification module 142 may classify the traveling area into a plurality of areas according to a predetermined reference. The traveling area may be defined as a range obtained by summing all planar areas on which the mobile robot 100 has travelled and a planar area on which the mobile robot 100 currently travels.

The area classification module 142 may classify the traveling area into a plurality of small areas and the small areas may be classified based on each room within the traveling area. The area classification module 142 may divide the traveling area into a plurality of large separate area due to travelling capability. For example, two indoor spaces that are completely separated from each other may each be divided into two large areas. In another example, even in the same indoor space, the large area may be divided based on each layer within the traveling area.

The learning module 143 may generate the map of the traveling area. The learning module 143 may process an image that is acquired through the image acquisition unit 120 at each position and may connect the image to the map to recognize the position of the whole area.

The recognition module 144 may estimate and recognize the current position. The recognition module 144 may make a connection to the learning module 143 using image information of the image acquisition unit 120, and thus even if a position of the mobile robot 100 is suddenly changed, the recognition module 144 may estimate and recognize the current position.

The mobile robot 100 may recognize a position through the area classification module 142 during continuous traveling and may also learn the map and estimate the current position through the learning module 143 and the recognition module 144 without the area classification module 142.

While the mobile robot 100 travels, the image acquisition unit 120 may acquire surrounding images of the mobile robot 100. Hereinafter, the image acquired by the image acquisition unit 120 is defined as an "acquired image". The acquired image may include various features such as lightings, an edge, a corner, a blob, or a ridge, which is positioned at the ceiling. Hereinafter, the feature may also be referred to as a feature point.

The learning module 143 may detect a feature from each of the acquired images. In a computer vision technological field, various methods for feature detection from an image have been well known. Various feature detectors appropriate for detection of the features have been well known. For example, the feature detector may include Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR, and Grey-level blobs detectors.

The learning module 143 may calculate a descriptor based on each feature point. The learning module 143 may convert a feature point into a descriptor using a scale invariant feature transform (SIFT) scheme in order to detect a feature. The descriptor may be indicated in an nth dimensional vector.

The SIFT scheme detects a feature that is not changed with respect to a scale, rotation, and brightness change of a photograph target and, thus, may detect a feature (i.e., a rotation-invariant feature) that is not changed even if the same area is photographed while changing a posture of the mobile robot 100. Needless to say, the present invention is not limited thereto and various other schemes (e.g., histogram of oriented gradient (HOG), Haar feature, Fems, local binary pattern (LBP), and modified census transform (MCT)) may also be applied.

The learning module 143 may classify at least one descriptor into a plurality of groups for each acquired image according to a predetermined low-ranking classification rule based on descriptor information obtained through an acquired image of each position and may convert descriptors included in the same group into a low-ranking representative descriptor according to a predetermined low-ranking representative rule.

In another example, all descriptors collected from the acquired images in a predetermined section such as a room may be classified into a plurality of groups according to a predetermined low-ranking classification rule, and descriptors included in the same group may each also be converted into a low-ranking representative descriptor according to the predetermined low-ranking representative rule.

The learning module 143 may acquire feature distribution of each position through such a procedure. The feature distribution of each position may be represented by a histogram or an nth dimensional vector. In another example, the learning module 143 may estimate an unknown current position based on a descriptor calculated from each feature point without a predetermined low-ranking classification rule and a predetermined low-ranking representative rule.

When the current position of the mobile robot 100 is unknown due to position jumping or the like, the learning module 143 may estimate the current position based on data such as a pre-stored descriptor or a low-ranking representative descriptor.

The mobile robot 100 may acquire the acquired image through the image acquisition unit 120 at the unknown current position. Various features such as lightings, an edge, a corner, a blob, or a ridge, which is positioned at the ceiling, may be checked through an image.

The recognition module 144 may detect features from the acquired image. Various methods for feature detection from an image and various feature detectors appropriate for feature detection in a computer vision technological field are the same as the above description.

The recognition module 144 may calculate a recognition descriptor through a recognition descriptor calculation operation based on each recognition feature point. In this case, the recognition feature point and the recognition descriptor are used for explanation of a procedure performed by the recognition module 144 and are used to be differentiated from the terms for explanation of a procedure performed by the learning module 143. However, features of the outside world of the mobile robot 100 are simply defined in different terms, respectively.

The recognition module 144 may convert the recognition feature point into the recognition descriptor using a scale invariant feature transform (SIFT) for the feature detection. The recognition descriptor may be represented by an nth dimensional vector.

As described above, the SIFT scheme is an image recognition scheme of selecting an easily identified feature point from an acquired image and then acquiring an nth dimensional vector using an abrupt degree of change in each direction as a numerical value for each dimension with respect to distribution feature (a direction in brightness change and an abrupt degree of change) of brightness gradient of pixels belonging to a predetermined area around each feature point.

The recognition module 144 may convert position information (e.g., feature distribution at each position) as a comparison target into comparable information (low-ranking recognition feature distribution) according to a predetermined low-ranking conversion rule based on at least one piece of recognition descriptor information acquired through the acquired image of the unknown current position.

According to a predetermined low-ranking comparison rule, each position feature distribution and each recognized feature distribution may be compared with each other to calculate similarity therebetween. Similarity (possibility) corresponding to each position may be calculated for each position, and a position at which the largest possibility is calculated may be determined as the current position.

As such, the controller 140 may classify a traveling area to generate a map configured with a plurality of areas or may recognize the current position of the main body 110 based on a pre-stored map.

When generating the map, the controller 140 may transmit the generated map to a mobile terminal through the communication unit 190. As described above, upon receiving the map from the mobile terminal, the controller 140 may store the map in the storage unit 150.

When the map is updated during travelling of the mobile robot 100, the controller 140 may transmit the updated information to the mobile terminal to equalize a map of the mobile terminal and a map stored in the mobile robot 100. As the map of the mobile terminal and the map stored in the mobile robot 100 are maintained to be equal, the mobile robot 100 may clean a determined area according to a cleaning command from the mobile terminal, and the current position of the mobile robot may be indicated to the mobile terminal.

In this case, the map may have a cleaning area classified into a plurality of areas, may include a connection path for connection of the plurality of areas, and may include information on an obstacle in the area. With regard to classification of the cleaning area, the cleaning area may be classified into small areas and large areas by the area classification module 142, as described above.

Upon receiving a cleaning command, the controller 140 may determine whether a position on the map and the current position of the mobile robot correspond to each other. The cleaning command may be input from a remote controller, an input unit, or a mobile terminal.

When the current position does not correspond to the position on the map or when it is not possible to check the current position, the controller 140 may recognize the current position, may restore the current position of the mobile robot 100, and then may allow the mobile robot 100 to travel to a determined area based on the current position.

When the current position does not correspond to the position on the map or when it is not possible to check the current position, the recognition module 144 may analyze the acquired image from the image acquisition unit 120 and may estimate the current position based on the map. As described above, the area classification module 142 or the learning module 143 may also recognize the current position.

After the position is recognized and the current position of the mobile robot 100 is restored, the traveling control module 141 may calculate a moving path from the determined area from the current position and may control the traveling unit 160 to move to the determined area.

When at least one area is selected from a plurality of areas from the mobile terminal, the traveling control module 141 may set the selected area as a determined area and may calculate the moving path. The traveling control module 141 may control the mobile robot 100 to move to the determined area and to then perform cleaning.

When a plurality of areas are selected as a determined area, the traveling control module 141 may determine whether a priority area of a plurality of areas is set or whether a cleaning order of a plurality of selected determined areas is set, may control the mobile robot 100 to move to the determined area, and to then perform cleaning.

When any one of a plurality of determined areas is set to a priority area, the traveling control module 141 may control the mobile robot 100 to move to the priority area of the plurality of determined areas, to first clean the priority area, to move to the remaining determined area, and to then to perform cleaning. When a cleaning order of the determined area is set, the traveling control module 141 may control the mobile robot 100 to perform cleaning while sequentially moving the determined area according to the determined cleaning order.

When an arbitrary area is set irrespective of classification of a plurality of areas on the map, the traveling control module 141 may control the mobile robot 100 to move the a preset determined area and to perform cleaning.

When cleaning on the set determined area is completed, the controller 140 may store a cleaning record in the storage unit 150.

The controller 140 may transmit information on an operation state or cleaning state of the mobile robot 100 to the mobile terminal through the communication unit 190 with a predetermined period. Accordingly, the mobile terminal may indicate a position of the mobile robot with the map on an image of a currently executed application and may output information on the cleaning state based on the received data.

The output unit 180 may include a display unit (not shown) for outputting an image and the sound output unit 180 for outputting sound. For example, the sound output unit 180 may be a speaker.

The output unit 180 may output various pieces of information according to control of the controller 140. For example, the output unit 180 may output a home appliance map as a map on which the type and position of the home appliance positioned within the traveling area are indicated, according to control of the controller 140.

The mobile robot 100 according to the present invention may determine the current position using feature points detected from an image acquired by a camera. The mobile robot 100 may generate a map of a traveling area based on position information determined through simultaneous localization and map-building (SLAM).

Hereinafter, with reference to FIGS. 6 to 8, a procedure in which the mobile robot 100 according to the present invention determines a type, position, and operation state of a home appliance are determined and a home appliance map is output will be described.

Figure 6:
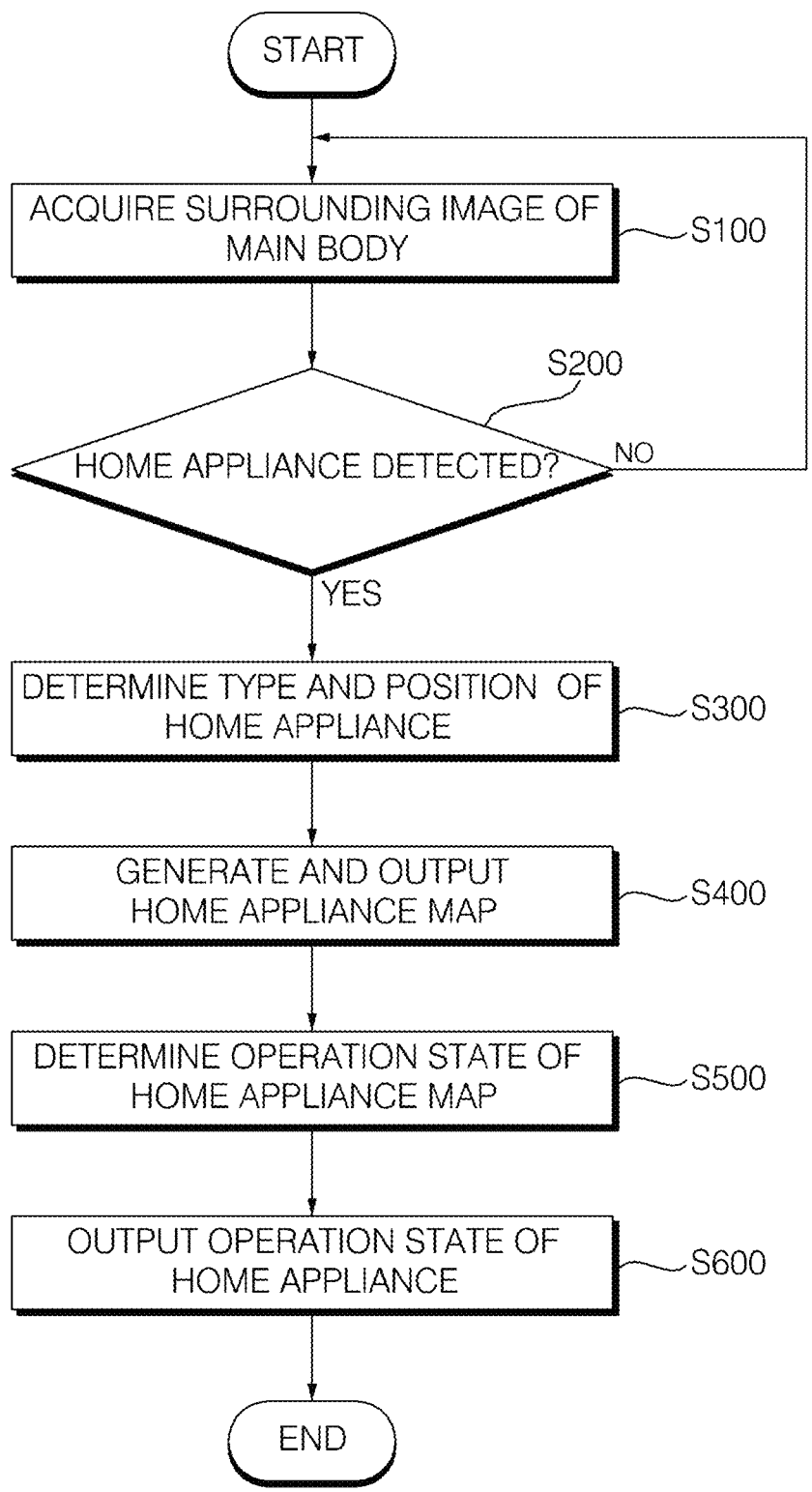
FIGS. 6 to 8 are flowcharts for explanation of an operation of a mobile robot according to the present invention.
Figure 7:
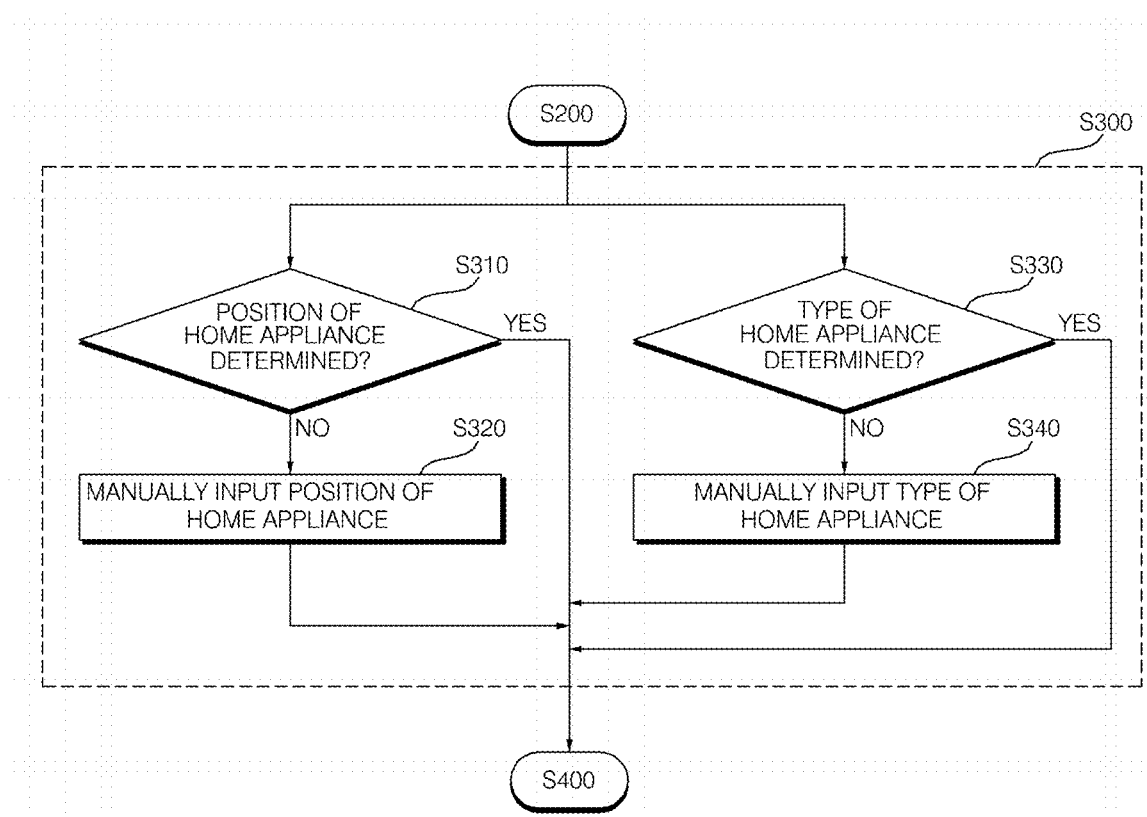
Figure 8:
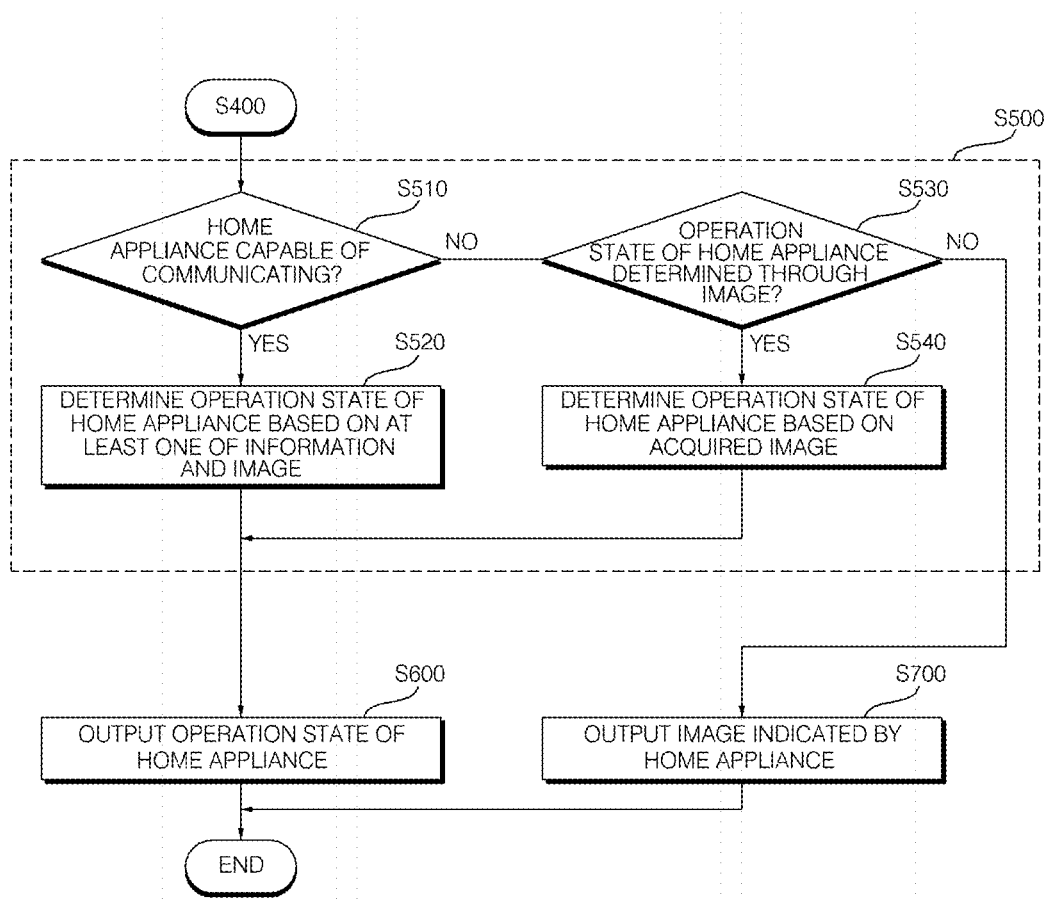

FIGS. 6 to 8 are flowcharts for explanation of an operation of the mobile robot 100 according to the present invention.

Referring to FIG. 6, the controller 140 may acquire a surrounding image of a main body through the image acquisition unit 120 (S100).

The controller 140 may acquire an image through the image acquisition unit 120 while moving the main body within the traveling area. For example, the controller 140 may acquire images in forward, backward, left, and right directions through the image acquisition unit 120. To this end, the mobile robot 100 may include at least one image acquisition unit 120.

The controller 140 may determine whether a home appliance is detected from the acquired image (S200).

The controller 140 may detect various objects from the acquired image and may determine whether the detected object is a home appliance.

The controller 140 may determine the type and position of the home appliance detected from the image (S300).

The controller 140 may detect the home appliance from the acquired image and may simultaneously perform a procedure of determining the type and position of the detected home appliance.

The controller 140 may determine the type and position of the home appliance disposed within the traveling area based on the image acquired through the image acquisition unit 120.

When the main body travels within the traveling area, the controller 140 may acquire various images within the traveling area. The various images within the traveling area may indicate various home appliances positioned within the traveling area. For example, an illumination apparatus positioned at the ceiling may be indicated in an image captured by photographing the ceiling of the traveling area, and a refrigerator, an air conditioner, a washing machine, a microwave range, a TV, or the like, which is positioned on a wall surface, may be indicated in an image captured by photographing the wall surface of the traveling area.

The controller 140 may perform deep learning based on the image and may determine the type of the home appliance. According to the present embodiment, the type of the home appliance may conceptually include a model name, a manufacturing date, a type, a function, a manufacturer, or the like of the home appliance.

Deep learning may analyze data using a machine learning procedure. The deep learning may analyze an image item indicated on the image based on a network to which the controller 140 is connected and data present in the storage unit 150.

For example, deep learning may be image analysis using a deep neural network (DNN). The DNN may be an artificial neural network (ANN) including a plurality of hidden layers between an input layer and an output layer. The DNN may perform modeling on complicated non-linear relationships. In the DNN configuration for identifying an object indicated in the image, elements configuring the image may be represented as a hierarchical structure. An object indicated in the image may be analyzed through the hierarchical structure.

The controller 140 may perform deep learning based on the acquired image. The controller 140 may perform deep learning using the acquired image to identify the object indicated in the image. For example, the controller 140 may perform deep learning based on an image in which a refrigerator is indicated to determine a model name, a manufacturer, a function, or the like of a refrigerator indicated in the image.

The controller 140 may determine the current position of the main body based on the acquired image and may determine the position of the home appliance within the traveling area based on the position of the main body and the position of the home appliance indicated in the image.

Upon determining the type and position of the home appliance, the controller 140 may generate and output a home appliance map (S400).

The storage unit 150 may store a traveling area map that is map information of the traveling area. The controller 140 may generate the home appliance map that is the traveling area map on which at least one of a type or position of the home appliance, based on the traveling area map. The home appliance map may be a map image obtained by indicating an icon corresponding to a type of the home appliance on the traveling area map. The icon corresponding to the home appliance may be indicated at a point corresponding to an actual position of a home appliance within the traveling area map.

The controller 140 may output the home appliance map through at least one of a preset mobile terminal or the output unit 180. In this case, the home appliance map may be output through the mobile terminal connected to the mobile robot 100 or the output unit 180 included in the mobile robot 100.

The preset mobile terminal may communicate with the mobile robot 100. When the home appliance map is output through the mobile terminal, the controller 140 may transmit generated home appliance map data to the mobile terminal through the communication unit 190. The mobile terminal may display the home appliance map transmitted by the controller 140 on the display unit. Accordingly, a user may check a type of a home appliance and a position of the home appliance within the traveling area through the mobile terminal.

The controller 140 may determine an operation state of the home appliance (S500).

The controller 140 may determine the operation state of the home appliance based on at least one of information received through the communication unit 190 or an image acquired through the image acquisition unit 120. In this case, the information received through the communication unit 190 may be data indicating the operation state of the home appliance. The home appliance may transmit the data corresponding to the operation state to the mobile robot 100.

The operation state of the home appliance may include various pieces of information related to an operation performed by the home appliance. For example, an operation state of a refrigerator may include setting temperature of each room, whether a door is open, or the like. For example, an operation state of a washing machine may include a currently executed laundry course, a remaining time to laundry end, or the like. For example, an operation state of an air conditioner may include a type and setting of executed driving, setting temperature, a wind volume, or the like.

The controller 140 may determine whether the home appliance is a device that is capable of communicating, based on information received through the communication unit 190 prior to determination of the operation state of the home appliance. The controller 140 may detect the home appliance that is capable of communicating through the communication unit 190.

The mobile robot 100 and the home appliance may be connected via communication. For example, the mobile robot 100 and the home appliance may perform communication through Bluetooth, Zigbee, Wi-Fi, other short-distance wireless communication, network communication network technology, or the like. The mobile robot 100 and the home appliance may transmit and receive various signals or information. For example, the home appliance may transmit data corresponding to at least one of a type, position, or operation state thereof to the mobile robot 100. For example, the controller 140 of the mobile robot 100 may receive data transmitted by the home appliance through the communication unit 190 and may receive a control signal for control of the home appliance to the home appliance to remotely control the home appliance.

When detecting the home appliance, the type and position of which are determined, as a home appliance that is capable of communicating, the controller 140 may determine the operation state of the home appliance based on at least one of an image acquired by the image acquisition unit 120 or information transmitted by the home appliance. The controller 140 may analyze an image item of the home appliance in the acquired image using a deep learning procedure and may determine the operation state of the home appliance. The controller 140 may determine the operation state of the home appliance based on data on the operation state, transmitted by the home appliance.

For example, the controller 140 may determine a currently executed laundry course, a remaining time to laundry end, or the like based on operation state information transmitted by the washing machine. For example, the controller 140 may determine whether a TV is turned on, a current channel, or the like based on an image item of the TV in the acquired image.

When the home appliance, the type and position of which are determined, is not a device that is capable of communicating, the controller 140 may determine the operation state of the home appliance based on an image item of the home appliance in the acquired image.

The controller 140 may output the operation state of the home appliance (S600).

The controller 140 may output the determined operation state of the home appliance through a preset mobile terminal or the output unit 180. For example, the controller 140 may indicate an expression or an indicator indicating the operation state of the home appliance on the mobile terminal or the output unit 180.

The controller 140 may generate a home appliance map that is a traveling area map on which at least one of a type, a position, or an operation state of the home appliance is indicated. In this case, the home appliance map may indicate the operation state of the home appliance as well as the type and the position of the home appliance. The controller 140 may output the generated home appliance map through at least one of a preset mobile terminal or the output unit 180.

The controller 140 may determine whether the home appliance is remotely controllable.

When the home appliance is a device that is capable of communicating, the controller 140 may transmit a control signal to the home appliance through the communication unit 190. When the controller 140 transmits the control signal and then receives a feedback signal to the control signal from the home appliance or determines that the home appliance is operated according to the control signal based on the acquired image, the controller 140 may determine that the home appliance is remotely controllable.

When the home appliance is a device that is not capable of communicating, the controller 140 may determine a control method of the home appliance according to the predetermined type of the home appliance. The control method of the home appliance may be determined according to the type of the home appliance. The type of the home appliance may include information on a detailed model name and specification. Accordingly, the controller 140 may determine the type of the home appliance to determine a remote control method of the home appliance. In this case, the controller 140 may transmit the control signal and may check whether the home appliance is remotely controlled using the determined remote control method.

For example, when a TV of a specific model name is a home appliance that is remotely controllable according to an infrared signal, the controller 140 may determine the type of the TV to determine that the TV is controllable according to the infrared signal. In this case, the controller 140 may transmit the infrared signal to the TV and may check whether the TV is operated in response to the transmitted infrared signal through the acquired image. When the TV is operated in response to the transmitted infrared signal, the controller 140 may lastly determine that the TV is remotely controllable according to the infrared signal.

The controller 140 may output information on whether the home appliance is remotely controllable through a preset mobile terminal or the output unit 180.

When determining whether the home appliance, the type and position of which are determined, is remotely controllable, the controller 140 may generate a home appliance map that is a traveling area map on which at least one of the type and the position of the home appliance, or whether the home appliance is remotely controllable is indicated. The controller 140 may output the generated home appliance map through a mobile terminal or the output unit 180.

Upon receiving a control command with respect to one of a plurality of home appliances indicated on the home appliance map through a preset mobile terminal or the input unit 137, the controller 140 may remotely control the selected home appliance based on the control command.

The mobile command received through the mobile terminal or the input unit 137 may be a command for selecting one of a plurality of home appliances and determining an operation to be performed by the selected home appliance. For example, when the home appliance map is indicated on the mobile terminal, and touch input of selecting an icon corresponding to a washing machine is received among icons respectively corresponding to a plurality of home appliances indicated on the home appliance map, the mobile terminal may additionally receive a command with respect to an operation to be performed by the selected washing machine. When the command with respect to the operation to be performed by the washing machine is completely input, the mobile terminal may generate a control command and may transmit the same to the mobile robot 100. The controller 140 may generate a control signal of performing the selected operation by the selected washing machine in response to the control command received through the communication unit 190 and may generate the control signal to the selected washing machine. The selected washing machine may perform the selected operation in response to the control signal transmitted from the mobile robot 100.

The controller 140 may move the main body to a controllable area corresponding to the remote control method of the selected home appliance and may remotely control the selected home appliance.

The controllable area may be an area in which the main body needs to be positioned in order to control a specific home appliance by the mobile robot 100. When the main body is positioned in the controllable area, the mobile robot 100 may remotely control the home appliance.

The controllable area may be present according to a communication method of the mobile robot 100 and the home appliance or the remote control method of the home appliance. For example, in the case of a home appliance that is remotely controllable according to an infrared signal, an area in which the infrared signal is capable of reaching the home appliance may be the controllable area. In the case of a home appliance that receives a control signal through Wi-Fi communication, an area in which a Wi-Fi signal is received may be a controllable area. In the case of a home appliance that receives a control signal through short-distance wireless communication such as Bluetooth or Zigbee, an area within a distance in which short-distance wireless communication from the home appliance is enabled may be the controllable area.

The controller 140 may determine a controllable area for each home appliance based on specification information included in the type of the home appliance, position information of the home appliance, information on the traveling area map. For example, upon receiving a control command of powering-on a TV controlled according to an infrared signal, the controller 140 may determine a controllable area in which the infrared signal is capable of being transmitted to the TV. The controller 140 may move the main body to the controllable area of the TV and may transmit an infrared signal of powering-on the TV to the TV. In this case, the TV may be powered on.

Accordingly, a user may control various home appliances present within the traveling area using the mobile terminal or the remote controller that is communication-connected to the mobile robot 100.

FIG. 7 is a flowchart for explanation of a detailed procedure of determining a position and type of a home appliance by the mobile robot 100.

When a home appliance is detected from an image, the controller 140 may determine a type and position of the detected home appliance (S300).

The controller 140 may determine the position of the home appliance based on the acquired image (S310).

The controller 140 may determine the current position of the main body based on the acquired image. The controller 140 may determine the position of the home appliance within the traveling area based on the determined position of the main body and the direction and position in which the home appliance is present in the image.

Upon determining the position of the home appliance, the controller 140 may indicate the determined position of the home appliance on the traveling area map, and thus may generate and output the home appliance map (S400).

When the position of the home appliance is not determined, the controller 140 may manually receive the position of the home appliance through a preset mobile terminal or the input unit 137 (S320).

To this end, when the position of the home appliance is not determined, the controller 140 may output a message indicating that it is not possible to determine the position of the home appliance and an input menu for directly inputting the position of the home appliance by a user through the mobile terminal or the output unit 180. In this case, the controller 140 may also output an image in which the home appliance, the position of which is not determined.

When receiving the position of the home appliance through the mobile terminal or the input unit 137, the controller 140 may indicate the received position of the home appliance on the traveling area map (S400).

The controller 140 may determine the type of the home appliance position within the traveling area based on the image acquired through the image acquisition unit 120 (S330).

The controller 140 may perform deep learning based on the image to determine the type of the home appliance. Accordingly, the controller 140 may determine a model name, a manufacturer, a control method, a drive method, a type, and other various specifications of the home appliance. For example, the controller 140 may also determine that the detected home appliance is a washing machine and may determine a model name, a manufacturer, a function, or the like of the washing machine.

When the type of the home appliance is determined, the controller 140 may indicate the determined type of the home appliance on the traveling area map, and thus may generate and output the home appliance map (S400).

When the type of the home appliance is not determined, the controller 140 may manually receive the type of the home appliance through a preset mobile terminal or the input unit 137 (S340).

To this end, when the type of the home appliance is not determined, the controller 140 may output a message indicating that it is not possible to determine the type of the home appliance and an input menu for directly inputting the type of the home appliance by a user through the mobile terminal or the output unit 180. In this case, the controller 140 may also output an image in which the home appliance, the type of which is not determined.

When receiving the type of the home appliance through the mobile terminal or the input unit 137, the controller 140 may indicate the received type of the home appliance on the traveling area map (S400).

The controller 140 may simultaneously determine the type and position of the detected home appliance.

FIG. 8 is a flowchart for explanation of a detailed procedure of determining an operation state of a home appliance by the mobile robot 100.

The controller 140 may determine the operation state of the home appliance (S500).

The controller 140 may determine whether the home appliance is a device that is capable of communicating based information received through the communication unit 190 (S510).

The controller 140 may detect the home appliance that is capable of communicating through the communication unit 190. The controller 140 may match the detected home appliance that is capable of communicating and the home appliance, the type and position of which are determined, and thus may determine whether the home appliance, the type and position of which are determined, is capable of communicating.

Upon determining that the home appliance, the type and position of which are determined, is capable of communicating, the controller 140 may determine the operation state of the home appliance based on at least one of an image acquired by the image acquisition unit 120 or information transmitted by the home appliance (S520).

The controller 140 may analyze an image item of the home appliance in the acquired image using a deep learning procedure and may determine the operation state of the home appliance. The controller 140 may determine the operation state of the home appliance based on data on the operation state, transmitted by the home appliance.

Upon determining that the home appliance, the type and position of which are determined, is not capable of communicating, the controller 140 may determine the operation state of the home appliance based on an image item of the home appliance in the acquired image (S530).

In this case, the home appliance is not capable of transmitting data corresponding to the operation state, and thus the controller 140 may analyze the image item of the home appliance in the acquired image using a deep learning procedure to determine the operation state of the home appliance.

Upon determining the operation state of the home appliance, the controller 140 may output the operation state of the home appliance (S600).

The controller 140 may output the determined operation state of the home appliance through a preset mobile terminal or the output unit 180. For example, the controller 140 may indicate an expression or an indicator indicating the operation state of the home appliance on the mobile terminal or the output unit 180.

The controller 140 may generate a home appliance map that is a traveling area map on which at least one of a type, a position, or an operation state of the home appliance is indicated. In this case, the home appliance map may indicate the operation state of the home appliance as well as the type and the position of the home appliance. The controller 140 may output the generated home appliance map through at least one of a preset mobile terminal or the output unit 180.

When it is not possible to determine the operation state of the home appliance, the controller 140 may output an image on which the home appliance is indicated, through the mobile terminal or the output unit 180 (S700).

In this case, the mobile terminal or the output unit 180 indicates the image, and thus a user may determine the operation of the home appliance by directly viewing the image.

Figure 9:
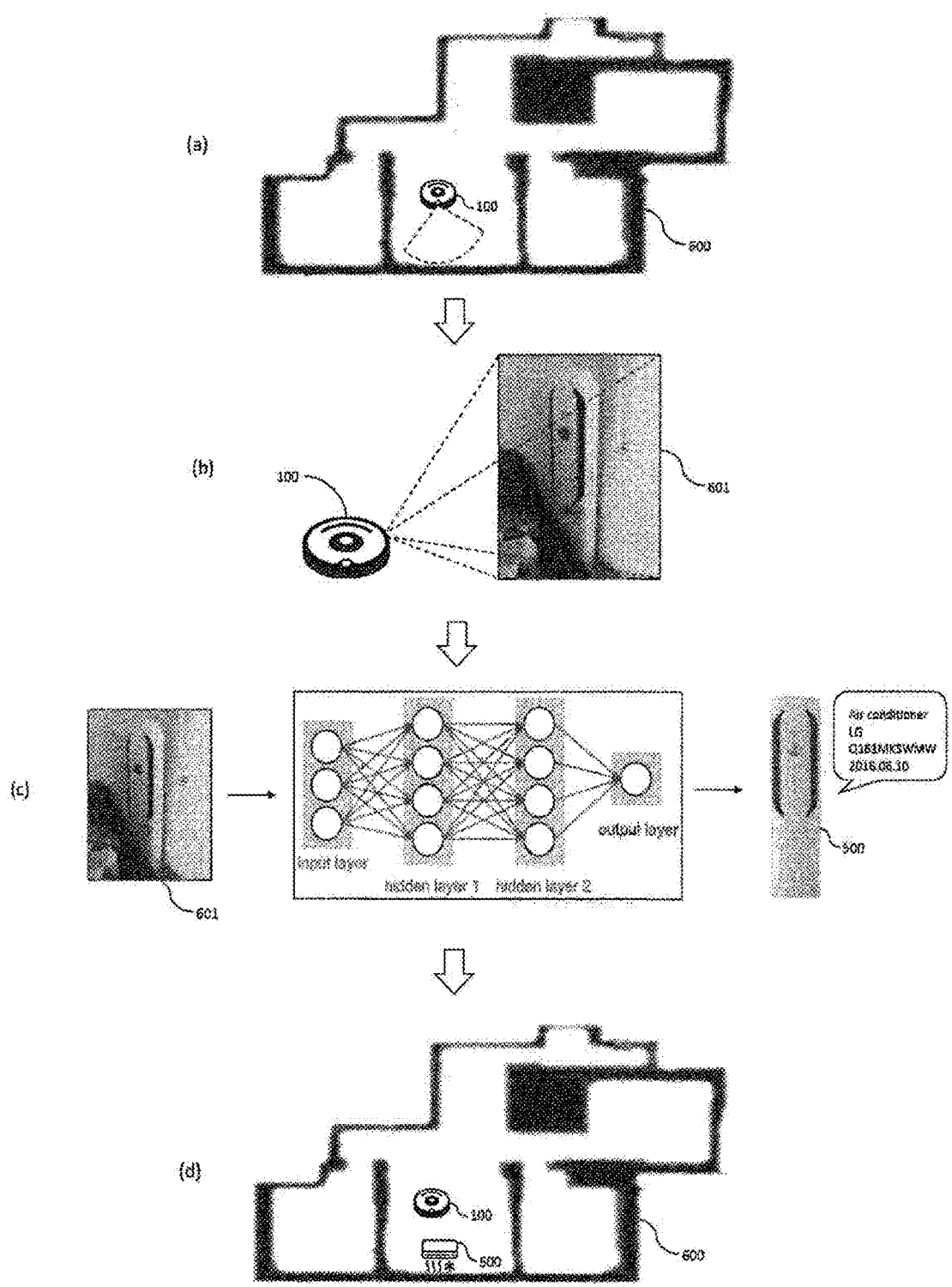
FIG. 9 is a diagram for explanation for explanation of a position and type of a home appliance by a mobile robot according to the present invention.

FIG. 9 is a diagram for explanation for explanation of a position and type of a home appliance by the mobile robot 100 according to the present invention.

Referring to (a), the mobile robot 100 may acquire a surrounding image while moving within the traveling area. The mobile robot 100 may photograph most areas present within the traveling area while moving in all areas of the traveling area.

The surrounding image may be an image in at least one direction of forward, backward, left, and right directions of the main body.

Referring to (b), the controller 140 may acquire an image 601 in which a home appliance is indicated, through the image acquisition unit 120.

The controller 140 may detect an object indicated on the acquired image. The controller 140 may perform a deep learning procedure based on the acquired image 601 to identify an object indicated on the image 601.

Referring to (c), the controller 140 may perform a deep learning procedure based on the acquired image 601 to determine a type of a home appliance, which is the object indicated on the image.

Deep learning may be image analysis using a deep neural network (DNN). The DNN may be an artificial neural network (ANN) including a plurality of hidden layers between an input layer and an output layer. The DNN may perform modeling on complicated non-linear relationships. In the DNN configuration for identifying an object indicated in the image, elements configuring the image may be represented as a hierarchical structure. An object indicated in the image may be analyzed through the hierarchical structure.

The controller 140 may perform deep learning based on the acquired image. The controller 140 may perform deep learning using the acquired image to identify the object indicated in the image. For example, the controller 140 may perform deep learning based on an image in which an air conditioner 500 is indicated to determine that the object indicated on the image, a model name, a manufacturer, a manufacturing date, or the like of the air conditioner 500.

Referring to (d), the controller 140 may determine the current position of the main body based on the acquired image and may determine the position of the home appliance within the traveling area based on the position of the main body and the position of the home appliance indicated in the image.

The controller 140 may indicate an icon corresponding to the home appliance at one point of the traveling area map, which corresponds to the determined position of the home appliance. The home appliance map on which the position of the home appliance is indicated may be output through the mobile terminal or the output unit 180.

Figure 10:
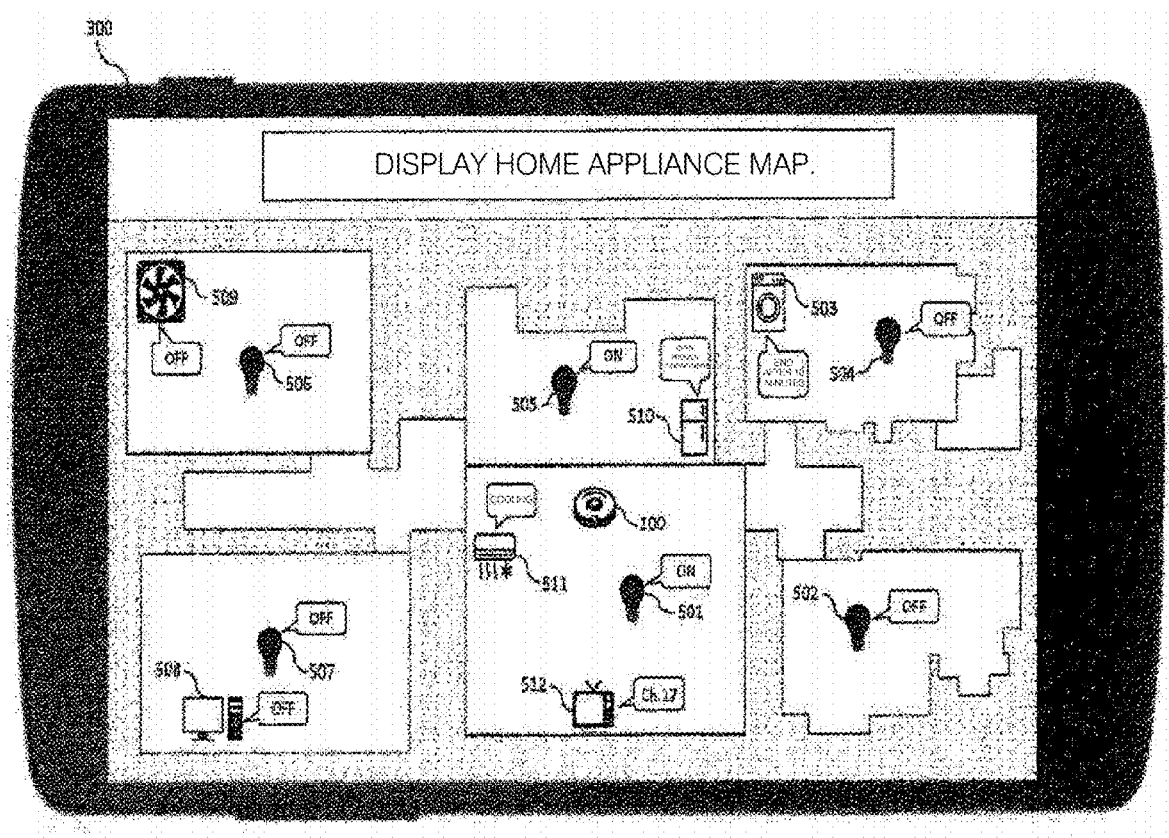
FIGS. 10 and 11 are diagrams for explanation of a home appliance map output by a mobile robot according to the present invention.
Figure 11:
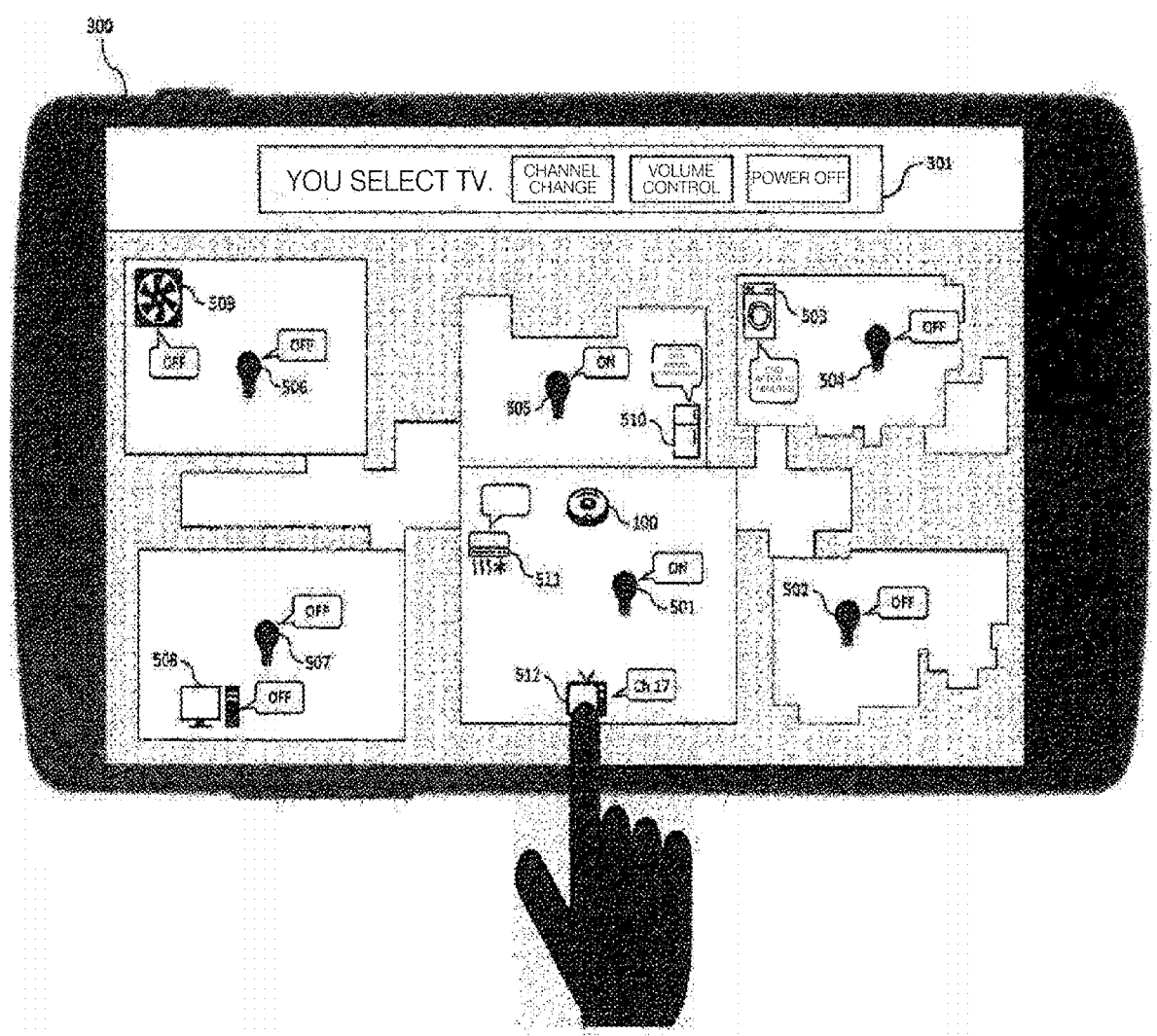

FIGS. 10 and 11 are diagrams for explanation of a home appliance map output by the mobile robot 100 according to the present invention.

Referring to FIG. 10, the controller 140 may output a home appliance map through a mobile terminal 300. In this case, the home appliance map may be displayed on a display unit of the mobile terminal 300.

The controller 140 may transmit data corresponding to the home appliance map to the mobile terminal through the communication unit 190 and the mobile terminal may indicate the home appliance map corresponding to data transmitted by the controller 140.

The home appliance map may be configured in an image that is changed in response to the operation state of the home appliance and a moving situation of the mobile robot 100. For example, when the operation state of a specific home appliance indicated on the home appliance map is changed, an icon corresponding to the home appliance, the operation state is changed, may be changed or an expression indicted with the icon may be changed.

The controller 140 may determine positions of the illumination apparatuses 501, 502, 504, 505, 506, and 507 from the acquired image while the mobile robot 100 moves to the traveling area, and may determine an operation state of each of the illumination apparatuses 501, 502, 504, 505, 506, and 507 based on the operation state information received from the illumination apparatuses 501, 502, 504, 505, 506, and 507. When the illumination apparatuses 501, 502, 504, 505, 506, and 507 are not capable of communicating, the controller 140 may also determine the operation states of the illumination apparatuses 501, 502, 504, 505, 506, and 507.

The controller 140 may indicate icons respectively corresponding to the illumination apparatuses 501, 502, 504, 505, 506, and 507 at points of the positions of the illumination apparatuses 501, 502, 504, 505, 506, and 507 on the traveling area map. The controller 140 may indicate an expression of each operation state of each of the illumination apparatuses 501, 502, 504, 505, 506, and 507 with the icon of each of the illumination apparatuses 501, 502, 504, 505, 506, and 507.

The controller 140 may determine positions of an air conditioner 511, a TV 512, a refrigerator 510, a washing machine 503, a ventilator 509, and a computer 508 from the acquired image while the mobile robot 100 moves to the traveling area, and may determine the operation state of the home appliance based on information received from the air conditioner 511, TV 512, the refrigerator 510, the washing machine 503, the ventilator 509, and the computer 508. The controller 140 may indicate an icon corresponding to each home appliance and an expression indicating the operation state at one point corresponding to the position of each home appliance on the traveling area map. Unlike the drawing, the operation state of each home appliance may also be indicated an indicator other than an expression.

Referring to FIG. 11, upon receiving input of selecting one of icons indicated on the home appliance map, the mobile terminal 300 may determine that the home appliance corresponding to the selected icon is selected.

Upon receiving input of selecting one of icons displayed on the home appliance map, the mobile terminal 300 may a control menu 301 for receiving a control command with respect to the home appliance corresponding to the selected icon, on a screen.

The control menu 301 may include a button corresponding to an operation to be performed by the selected home appliance. For example, when an icon corresponding to a TV is selected, a mobile terminal may display the control menu 301 for controlling the TV, on a screen. The mobile terminal 300 may display buttons corresponding to channel change, volume control, and power, which corresponds to the operation to be performed by the TV, on the control menu 301 for control of the TV.

Upon receiving input corresponding to the control menu 301, the mobile terminal 300 may determine that a control command corresponding to the selected home appliance is received. The mobile terminal 300 may transmit a signal corresponding to the control command to the mobile robot 100. For example, when the TV is selected and input corresponding to channel change is received, the mobile terminal 300 may transmit a control command of changing a channel of the selected TV to the mobile robot 100 according to user input.

The controller 140 may remotely the home appliance based on the control command transmitted by the mobile terminal 300. The controller 140 may transmit a control signal to the selected home appliance in such a way that the home appliance selected according to the control command performs an operation corresponding to the control command. The home appliance that receives the control signal transmitted by the controller 140 may perform the operation corresponding to the control command. For example, upon receiving a control command corresponding to channel change of the TV through the mobile terminal 300, the controller 140 may transmit a control signal of changing a channel of the selected TV to the TV, and thus may perform control to change a channel output from the TV.

Hereinafter, an embodiment of control of various home appliances based on a situation of the mobile robot 100 according to the present invention will be described.

The mobile robot 100 according to the present invention may further include a sensing unit (not shown) for detecting an object. The sensing unit may be a device for detecting an object with a predetermined volume. For example, the sensing unit may include at least one of an infrared sensor, an ultrasonic sensor, radar, or Lidar. The mobile robot 100 may include at least one sensing unit.

The controller 140 may detect an object present around the main body through the sensing unit. When the object is detected, the sensing unit may transmit object information on a distance and direction in which the object is detected, to the controller 140. The controller 140 may determine a position of the object detected around the main body based on the object information transmitted by the sensing unit.

The controller 140 may control at least one of a plurality of home appliances based on at least one of information acquired from a plurality of home appliances positioned within the traveling area, image information acquired through the image acquisition unit 120, object information acquired through the sensing unit, or information acquired through the communication unit 190.

According to an embodiment of the present invention, when cleaning is performed within the traveling area, the controller 140 may determine an air state based on information acquired from a home appliance for detecting an air state among a plurality of home appliances, and may control a home appliance that affects the air state among a plurality of home appliances in response to the determined air state.

The air state may include at least one of temperature, humidity, atmospheric pressure, or the amount of dust. The home appliance for detecting the air state may be a device for measuring at least one of temperature, humidity, atmospheric pressure, or the amount of dust. For example, the home appliance for detecting the air state may be an air conditioner or various measuring apparatuses.

When cleaning is performed, the controller 140 may control a home appliance that affects the air state among a plurality of home appliances present within the traveling area, and thus may adjust the air state. The home appliance that affects the air state may include an air conditioner, an electric fan, a heating apparatus, a cooling apparatus, an air cleaner, a ventilator, or the like.

For example, when cleaning is performed, if the amount of dust within the traveling area is determined to be equal to or greater than a setting amount based on information acquired from the home appliance for detecting the air state, the controller 140 may operate at least one of an air conditioner, an air cleaner, or a ventilator, which is present within the traveling area, to reduce the amount of dust. The setting amount may be determined to a reference value of the amount of dust via an experiment. The setting amount may be set by a user and may be a value stored in the storage unit 150.

For example, when cleaning is performed, if at least one of temperature, humidity, or atmospheric pressure of the traveling area is determined to be outside a setting range based on the acquired information, the controller 140 may operate at least one of an air conditioner, an air cleaner, a cooling apparatus, a heating apparatus, an electric fan, or a ventilator, which is present in the traveling area, to adjust a value outside the setting range of temperature, humidity, and atmospheric pressure, within the setting range. The setting range may be a reference range of each of temperature, humidity, and atmospheric pressure. The setting range may be determined by an experiment or may be set by a user. The setting range set by the user may be stored in the storage unit 150.

According to an embodiment, in a crime prevention mode, upon determining that a moving object is present based on at least one of object information or image information, the controller 140 may operate an illumination apparatus, may perform emergency contact through a communication device, and may store the acquired image.

The crime prevention mode may be one of operation modes of the mobile robot 100. In the crime prevention mode, the mobile robot 100 may determine presence of an invader and may perform an operation corresponding thereto when the invader is detected, in order to prevent a third person from intruding on a traveling area.

The controller 140 may determine that an invader is present within the traveling area based on object information provided by the sensing unit and an image provided by the image acquisition unit 120, in the crime prevention mode. In the crime prevention mode, the controller 140 may move the main body into the traveling area in order to detect all areas of the traveling area by the mobile robot 100. When a moving object is detected, the controller 140 may determine that the detected object is an invader based on at least one of object information or image information.

When the invader is detected, the controller 140 may perform control to turn on an illumination apparatus within the traveling area included in the home appliance. Accordingly, the traveling area brightens, and thus a user may easily recognize the invader or may easily acquire an image of the invader through the image acquisition unit 120.

When the invader is detected, the controller 140 may perform emergency contact through a communication device included in the home appliance. The communication device may be a device for transmitting a message or call to a preset terminal. Emergency contact may be performed by transmitting a message or call to a preset terminal by the communication device. For example, when the invader is detected, a telephone device present within the traveling area may transmit call to a terminal of a preset police station to perform emergency contact.

When the invader is detected, the controller 140 may store the image acquired through the image acquisition unit 120, in the storage unit 150. The controller 140 may also transmit an image from which the invader is detected, to a preset terminal. The image in which the invader is present may be used as evidence in the future.

According to an embodiment of the present invention, upon determining that predetermined illumination is required to determine a position of the main body based on image information, the controller 140 may light at least one illumination apparatus corresponding to a position of the main body among a plurality of illumination apparatuses.

When illumination detected through the image acquisition unit 120 is equal to or less than setting illumination, the controller 140 may turn on an illumination apparatus corresponding to a position of the main body 110 among a plurality of illumination apparatuses positioned in the traveling area, based on the home appliance map. The setting illumination may be minimum illumination required to determine the position of the main body 110 through the image by the controller 140. The setting illumination may be illumination that is required for the controller 140 to detect and determine a surrounding obstacle or a surrounding environment through the image acquired by the image acquisition unit 120. The setting illumination may be determined via an experiment or may be a value stored in a storage unit.

When illumination of a surrounding environment of the mobile robot 100 is already sufficient, it is not required to ensure illumination by turning on the illumination apparatus, and thus, when surrounding illumination is greater than the setting illumination, the controller 140 may turn off an illumination apparatus corresponding to a position of the main body, thereby saving energy.

A traveling area 600 may include a plurality of rooms, and at least one of the illumination apparatuses 501, 502, 504, 505, 506, and 507 may be disposed in the plurality of rooms. In this case, the plurality of rooms and the plurality of illumination apparatuses 501, 502, 504, 505, 506, and 507 may be indicated in the home appliance map.

The controller 140 may turn on an illumination apparatus disposed in a room that the main body 110 enters, based on the home appliance map. The controller 140 may turn on the illumination apparatus disposed on the room that the main body 110 enters, and thus may ensure illumination required to detect surroundings.

The controller 140 may turn off the illumination apparatus disposed in a room from which the main body 110 leaves, based on the home appliance map. The controller 140 may turn off the illumination apparatus of the room from which the main body 110 leaves, thereby saving energy.

For example, when the main body 110 enters a room in which a second illumination apparatus 502 is installed, the controller 140 may control the second illumination apparatus to be turned on and may control the second illumination apparatus to be turned off when the main body 110 leaves from the corresponding room.

The controller 140 may turn on the illumination apparatuses 501, 502, 504, 505, 506, and 507 of the room that the mobile robot 100 enters, and may turn off an illumination apparatus of a room from which the mobile robot 100 leaves when the mobile robot 100 leaves from the room that the mobile robot 100 has entered, thereby maximizing energy efficiency.

According to another embodiment of the present invention, when the controller 140 determines a position of the main body 110 and determines that it is not possible to determine the position of the main body 110 due to low illumination of the image based on the image acquired through the image acquisition unit 120, the controller 140 may turn on all of the plurality of illumination apparatuses 501, 502, 504, 505, 506, and 507. When it is not possible to determine positions of the illumination apparatuses 501, 502, 504, 505, 506, and 507 positioned within the traveling area 600, a position of each illumination apparatus is not capable of being recognized, and thus the controller 140 may turn on all of the illumination apparatuses 501, 502, 504, 505, 506, and 507 within the traveling area 600 upon determining that additional illumination needs to be ensured in order to determine the current position of the mobile robot 100.

Minimum illumination required to determine the position of the main body 110 may be a value that is determined via an experiment and is pre-stored in a storage unit. When the position of the illumination apparatus is not capable of being recognized, if the current illumination is equal to or less than the minimum illumination, the controller 140 may turn on all of the illumination apparatuses 501, 502, 504, 505, 506, and 507 within the traveling area 600, and thus may ensure illumination and then may determine the current position of the mobile robot 100.

Although all elements constituting the embodiments of the present invention are described as integrated into a single one or to be operated as a single one, the present invention is not necessarily limited to such embodiments. According to embodiments, all of the elements may be selectively integrated into one or more and be operated as one or more within the object and the scope of the present invention.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A mobile robot comprising
a main body;
a traveling unit configured to move the main body;
a communication device to communicate with at least one external apparatus;
an image acquisition unit configured to acquire an image; and
a controller configured to control the traveling unit to move the main body within a traveling area;
wherein the controller determines a type and a position of a home appliance positioned within the traveling area based on an image acquired through the image acquisition unit,
wherein the controller determines whether the home appliance is a device that is capable of communicating, based on information received through the communication device,
when the home appliance is determined to be the device that is capable of communicating, the controller determines an operation state of the home appliance based on at least one of an image acquired by the image acquisition unit or information transmitted by the home appliance, and
when the home appliance is determined to not be the device that is capable of communicating, the controller determines the operation state of the home appliance based on an image item of the home appliance indicated in the image.

2. The mobile robot of claim 1, wherein the controller performs deep learning based on the image to determine the type of the home appliance.

3. The mobile robot of claim 1, further comprising a storage unit configured to store a traveling area map,
wherein the controller generates a home appliance map that is the traveling area map in which at least one of the type or the position of the home appliance is indicated, based on the traveling area map, and outputs the home appliance map through at least one of a preset mobile terminal or an output device of the mobile robot.

4. The mobile robot of claim 1, further comprising a storage unit configured to store a traveling area map,
wherein the controller outputs a home appliance map that is a traveling area map in which at least one of a type, a position, or an operation state of the home appliance is indicated, through at least one of a preset mobile terminal or an output device of the mobile robot.

5. The mobile robot of claim 1, further comprising a storage unit configured to store a traveling area map,
wherein the controller determines whether the home appliance is remotely controllable, and outputs a home appliance map that is a traveling area map in which at least one of a type, a position of the home appliance, or whether the home appliance is remotely controllable is indicated, through at least one of a preset mobile terminal or an output device of the mobile robot.

6. The mobile robot of claim 5, wherein, upon receiving a control command with respect to one of a plurality of home appliances indicated on the home appliance map through the mobile terminal or an input device of the mobile robot, the controller remotely controls a selected home appliance based on the control command.

7. The mobile robot of claim 6, wherein the controller moves the main body to a controllable area corresponding to a remote control method of the selected home appliance and remotely controls the selected home appliance.

8. The mobile robot of claim 1, further comprising a sensor configured to detect an object,
wherein the controller controls at least one of a plurality of home appliances based on at least one of information acquired from the plurality of home appliances positioned within the traveling area, image information acquired through the image acquisition unit, object information acquired through the sensor, or information acquired through the communication device.

9. The mobile robot of claim 8, wherein, when cleaning is performed within the traveling area, the controller determines an air state based on information acquired from a home appliance configured to detect the air state among the plurality of home appliances, and controls a home appliance that affects the air state among the plurality of home appliances in response to the determined air state.

10. The mobile robot of claim 8, wherein the plurality of home appliances include an illumination apparatus and another communication device, and
wherein, upon determining that a moving object is present based on at least one of the object information or the image information in a crime prevention mode, the controller operates the illumination apparatus, performs emergency contact through the other communication device, and stores an acquired image.

11. The mobile robot of claim 8, wherein the plurality of home appliances include a plurality of illumination apparatuses positioned within the traveling area; and
wherein, upon determining that predetermined illumination is required to determine a position of the main body based on the image information, the controller lights at least one illumination apparatus corresponding to the position of the main body among the plurality of illumination apparatuses.

* * * * *